Dec. 15, 1953            L. B. JOHNSON            2,662,987

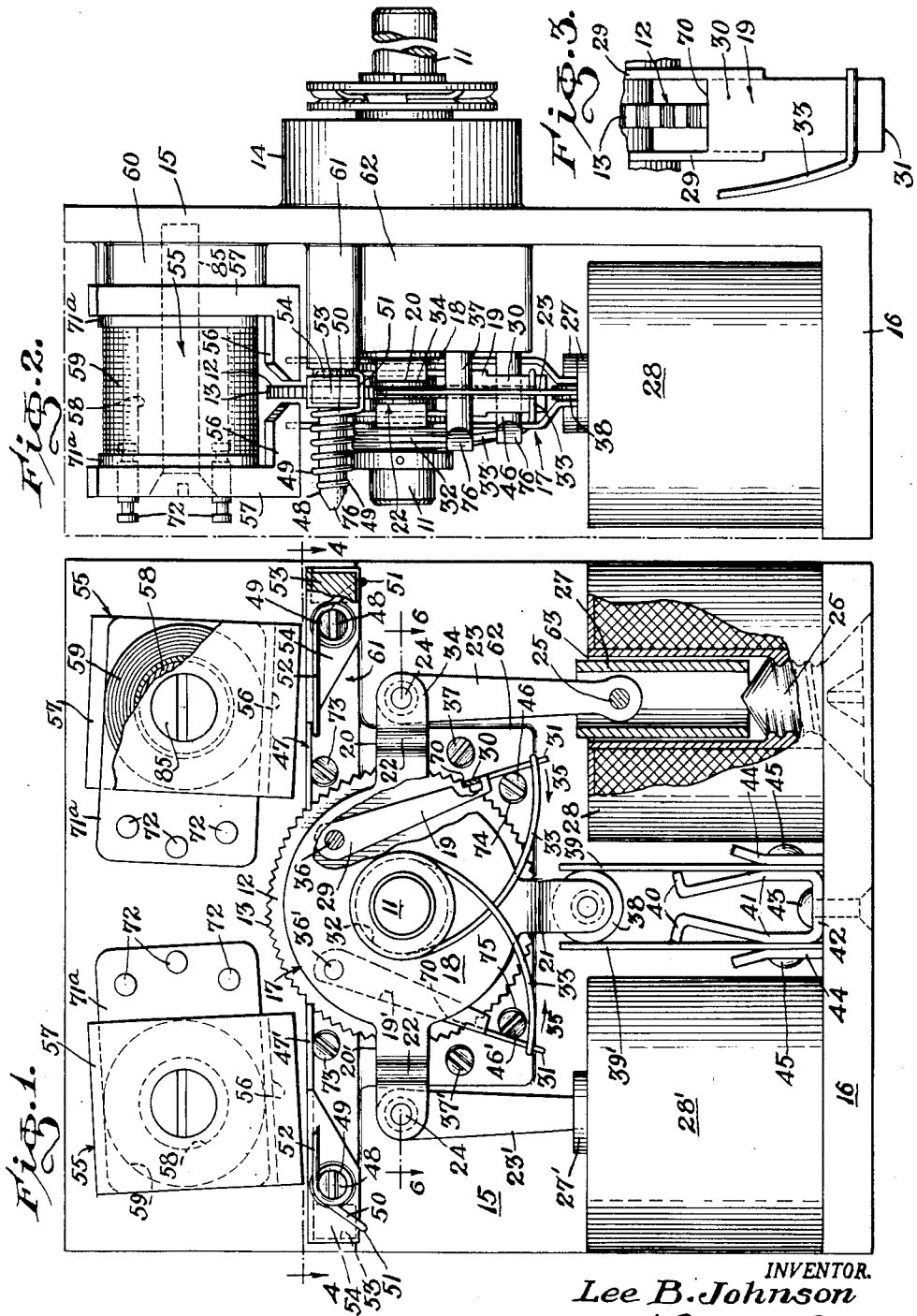

ELECTRIC PULSE OPERATED MOTOR

Filed July 18, 1951            2 Sheets-Sheet 2

INVENTOR.
Lee B. Johnson
BY Lynn Latta
Attorney.

Patented Dec. 15, 1953

2,662,987

UNITED STATES PATENT OFFICE 2,662,987

ELECTRIC PULSE OPERATED MOTOR

Lee B. Johnson, Los Angeles, Calif.

Application July 18, 1951, Serial No. 237,457

11 Claims. (Cl. 310—34)

This invention relates to electric pulse operated motors of the type in which a series of pulses are applied to a rotatable shaft through ratchet mechanism which has a stepping operation. Such motors are especially useful for the actuation of control instruments wherein extreme accuracy of the degree of angular movement of the shaft is important. For example, in the operation of guided missiles, the remote control of steering apparatus may require a servomotor adapted to respond with very small increments of rotative adjustments of a driven member such as a shaft, in response to a signal transmitted over radio waves. In the application of the pulse motor of my invention to this servomotor function, the signal is in the form of a series of pulses of electrical energy, each utilized by one or more solenoids or other electromagnetic motor devices, for actuating the pawl or pawls of a ratcheting or stepping mechanism through which movement is transmitted to the output shaft of the servomotor.

The broad concept of utilizing a series of electrical pulses to actuate a stepping or ratcheting mechanism which in turn rotates an output shaft through an angular degree of movement depending upon the number of pulses transmitted is not new. However, prior devices of this type have embodied certain objectionable features and have failed to overcome some of the problems embodied in the attainment of extreme accuracy. Accordingly, the general object of the present invention is to provide an improved form of stepping motor which may be relied upon to provide accurate and uniform response to the pulses transmitted to it, so as to infallibly measure the degree of rotation of the output shaft by the number of pulses transmitted.

A specific object of the present invention is to provide, in such a stepping motor, an improved arrangement of driving pawls, holding pawls and stop mechanism whereby the angular amplitude of rotation transmitted to the output shaft for each pulse is accurately measured and therefore may be depended upon to be the same for each successive pulse.

A further object is to provide an improved arrangement of driving and holding pawls in which the disengagement of the pawls from the teeth of the ratchet wheel does not impose any substantial or appreciable backload or resistance in the driving mechanism.

A further object is to provide a pulse motor having an improved arrangement of electromagnetic means for sequentially releasing a holding pawl and then operating a driving pawl, utilizing a single pulse.

A further object is to provide an improved pulse motor which is reversible in operation, i. e. can be operated selectively in either direction by the selective use of either one of two distinguishable signals.

A further object is to provide an improved pulse motor having improved means for yieldingly biasing a pawl driving member to a neutral position and returning it to that position after said pawl driving member has been actuated in one direction or the other for driving the ratchet wheel of the motor through one of the driving pawls thereof.

Another object is to provide a pulse motor having a relatively simple and inexpensive yet effective arrangement of driving pawls and yielding means for yieldingly maintaining the driving pawls in engagement with the ratchet wheel of the device.

A further object of the invention is to provide a pulse motor embodying all of the above described features in a fairly compact device, dependable in operation, serviceable, readily manufactured and assembled, and as easily serviced.

Other objects will become apparent in the ensuing specifications and appended drawings in which:

Fig. 1 is a front view of my improved pulse motor, with portions broken away to better illustrate the construction;

Fig. 2 is a side view of the same;

Fig. 3 is a fractional detail side view of a driving pawl;

Figure 4:
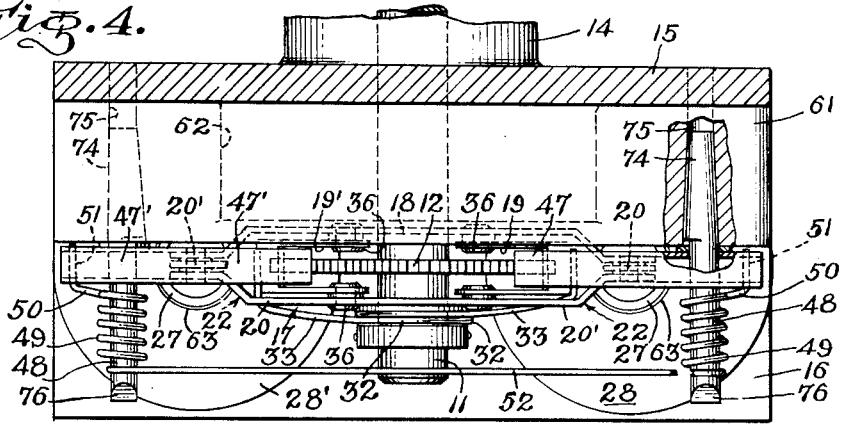
Fig. 4 is a horizontal sectional view of the same taken on the line 4—4 of Fig. 1.

As an example of one form in which my invention may be embodied, I have shown in the drawings a pulse motor having an output shaft 11, to which is fixed a ratchet wheel 12 having a large number of small triangular teeth 13 each having both sides thereof disposed at equal angles of inclination to a radius passing through its tip. Shaft 11 is journalled for rotation in a suitable bearing 14 carried by a mounting panel 15 the lower end of which is secured to a base 16. The operating mechanism of the motor is mounted on the panel 15 and base 16.

The invention utilizes a pawl carrier 17 comprising a pair of axially spaced discs 18 centrally apertured and rotatably mounted upon shaft 11 with the ratchet wheel 13 and a pair of driving pawls 19, 19' embraced therebetween. Each of the discs 18 has diametrically opposed lever arms 20, 20' and an intermediate arm 21, all projecting radially therefrom with the arm 21 extending at right angles to arms 20, 20'. The pairs of arms 20, 20' respectively are offset toward each other at 22, so as to provide closely spaced pairs of end portions 34 which embrace respective stamped sheet metal connecting rods 23, 23' to which they are pivoted by rivets 24. Connecting arms 23, 23', at their other ends, are pivoted, by means of pintles 25, in the ends of a pair of armatures 27 which operate in solenoid coils 28, 28' respectively. These are the solenoids which actuate the driving pawls 19, 19' to drive the motor. Each armature 27 is tubular, its free end adapted to rest against the conical end of a stop screw 26 adjustably threaded through base 16.

Driving pawls 19, 19' (Fig. 3) are of stamped sheet metal construction, each having a pair of spaced, parallel, flat arms 29 integrally joined at their outer ends by a web portion 30 which terminates, between the arms 19, 19' in a driving jaw 70 adapted to engage the teeth 13 of the ratchet wheel. Web portions 30 are extended to form arms 31 which are joined by a mousetrap type spring. The spring includes a central coiled portion 32 coiled around shaft 11, and extended arm portions 33. The ends of arm portions 33 are hooked around the ends of the arms 31 of driving pawls 19, 19', and are constrained toward each other by tension in the spring, as indicated by arrows 35. Thus the single spring functions to draw both pawls yieldingly into engagement with the toothed periphery of the ratchet wheel 12. At this point it may be noted that the ratchet wheel is embraced between the spaced parallel arms 29 of the respective driving pawls, whereby the jaws at the inner ends of web portions 30, bridging between the arms 29, may engage the teeth 13.

The pawl arms 29 are received between the respective sides of ratchet wheel 12 and the disc portions 18 of the pawl carrier 17 and are pivotally connected to the latter by rivets 36. In operation, the pawls 19, 19' have limited swinging movement upon pivots 36, of sufficient amplitude to clear the tips of ratchet teeth 13 as successive teeth are engaged. Pivots 36 are located radially intermediate the shaft 11 and the periphery of ratchet wheel 17, so as to dispose the pawls 19, 19' in chordal positions such that the jaws 70, in the swinging movements of the pawls, will move in paths substantially coincident with the sides of teeth 13. Thus a pawl may swing outwardly to clear a tooth 13 without requiring or allowing any appreciable circumferential shift between the pawl carrier and the ratchet wheel. Arms 29 are of sufficient length, from the driving jaws 70 to the axes of pivots 36, so that the relatively short arcs of movement of the driving jaws are substantially straight lines. The angle of diagonal crossing of the periphery of the ratchet wheel by the respective pawls is the difference between 90° and the angle of inclination of the side of a tooth to its radius. As shown, the angle of inclination of the sides of the teeth is approximately 45°, and accordingly the said angle of crossing is about the same.

The radius of the disc portions 18 of the pawl carrier determines the maximum length of pawls 19, 19'. For maximum length in the pawls 19, 19', the inner end portions thereof project beyond the radius normal to the pawl, to substantially the peripheries of disc members 18, and the latter approach their maximum possible diameter relative to the diameter of ratchet wheel 12. The diameter of the disc portions 18 must not be greater than the root diameter of the teeth 13 and is preferably somewhat less, as shown in Fig. 1, in order that there may be no interference between the inner ends of web portions 30 and the peripheries of disc portions 18.

In response to energization of a solenoid 28 or 28', pawl carrier 17 will transmit movement through a pawl 19 or 19' respectively, the amplitude of such movement being determined by engagement of a driving pawl with a stop pin 37 or 37' respectively. The starting pin of such movement is the centered or neutral position of the pawl carrier shown in Fig. 1. This neutral position is determined by the engagement of a roller 38 (pivotally mounted between arms 21) by a pair of leaf springs 39, 39' which are tensioned to yieldingly press against the opposite sides of roller 38 and to both substantially engage the roller in the neutral position shown in Fig. 1. In this neutral position, intermediate portions of leaf springs 39, 39' are engaged under tension against stop fingers 40 which may comprise the upper end portions of a U-shaped yoke 41 having a web portion 42 which is secured to base 16 as by means of a rivet 43. Leaf springs 39 are secured at their lower ends to the side arms of yoke 41 by means of clamp plates 44 and rivets 45. It will now be apparent that with the positions of springs 39, 39' accurately determined by their yielding engagement against stop fingers 40, their upper ends will accurately determine the centered or neutral position of the pawl carrier, provided that the tips of stop fingers 40 are accurately spaced the correct amount to determine a spacing for the upper ends of the springs corresponding to the diameter of roller 38, whereby the springs 39, 39' may simultaneously engage the tips of both fingers 40 and also both sides of the roller 38. The positions of the tips of fingers 40 are adjusted during assembly of the motor, so as to establish this condition and so as to correlate the neutral position of the pawl carrier with the spacings between stop fingers 37, 37' and the respective pawls, in a manner to equalize said spacings in the neutral position of the carrier.

The spacings between pawls 19, 19' and stop pins 37, 37' in the neutral position of the carrier, correspond to the spacing between a predetermined number of the ratchet teeth 13 (e. g. between successive teeth), so that the ratchet wheel will be advanced an amount corresponding to that number of teeth, for each actuation. In the arrangement shown, the ratchet wheel will be advanced a distance corresponding to one tooth for each actuation, and will recover one tooth on the return stroke.

During an advancing stroke, one of the driving pawls will remain engaged with the ratchet wheel to transmit drive thereto while the other pawl is disengaged in order to permit the pawl carrier to return to the neutral position while leaving the ratchet wheel arrested in the position to which it was advanced. To effect the release of the inactive pawl from the ratchet wheel, I provide a pair of release pins 46, 46' which are positioned to barely clear the inner faces of pawl extension arms 31 in the neutral positions thereof. Accordingly, the inactive pawl will make contact with its release pin 46 immediately upon commencement of a driving stroke of the pawl carrier, and thus movement of the inactive pawl with the pawl carrier and ratchet wheel will be prevented. Accordingly, the ratchet wheel will simply rotate out of engagement with the inactive pawl, the driving end of the latter swinging outwardly with reference to the periphery of the ratchet wheel and clearing the teeth 13.

To arrest the ratchet wheel in the position to which it has been advanced, I provide a pair of holding pawls 47, 47' each pivotally mounted on a respective pivot pin 48 and yieldingly acted upon by a spring so as to be maintained in engagement with respective stop pins 73 which position them for coaction with the ratchet wheel teeth 13. The spring just mentioned includes coiled portions 49 each coiled about a respective pivot pin 48, arms 50 each having a finger 51 extending parallel to pivot 48 and engaged beneath the outer end of a respective holding pawl, and a bridging portion 52 which integrally joins the two coils 49 (see Fig. 4). I find that the most satisfactory operation is obtained by balancing, against a majority of the spring load, the gravity load of a counterweight 53 secured in the outer end portion of a respective holding pawl. At this point it may be noted that pawls 47, 47', as shown, have outer portions which are of channel section, each including side flanges or ears 54 which are apertured to provide bearings for mounting the pawls on the pivot pins 48. The counter weights 53 are secured in any suitable manner between ears 54.

For releasing the holding pawls 47, 47', I provide a pair of electromagnets 55, 55', each having pole pieces 56 disposed immediately above a respective holding pawl and slanted to correspond to the position of inclination of the same in the raised position thereof. The pole pieces 56 may constitute inwardly projecting end portions of side arms 57 of square horseshoe type armatures, the arms 57 being joined by bridging cores 58 about which are wound the coils 59 of the electromagnets. Each electromagnet embodies separators 71, 71a insulating coils 59 from arms 57, separators 71a being extended to provide supports for terminal posts 72.

Pawls 47, 47' constitute swinging armatures, and, in association with electromagnets 55, 55', may be referred to as clapper type solenoids, a commonly used term for such an arrangement.

Electromagnets 55, 55' are suitably mounted on back panel 15, as by means of bosses 60 projecting forwardly from the back panel, and screws 48; releasing pins 46, 46' and stop pins 37, 37' are mounted in lugs or bosses 61 and 62 projecting forwardly from back panel 15. Solenoids 28, 28' are of conventional annular coil form, have their lower ends mounted on base 16, and have central bores 63 in which the armatures 27, operate. Pins 46, 46', 37, 37' and 73, 73' are each provided with an eccentrically disposed shank portion 74 of taper pin form, press fitted into a bore 75 of correspondingly tapered form, extending through a respective boss 61 or 62 and through back panel 15, so that a knockout pin may be inserted to drive a shank portion 74 loose from its wedging engagement in bore 75. Each pin 46, etc., has a flattened outer end 76 by means of which, when loosened, it may be grasped between the jaws of a pair of pliers and rotatably adjusted in order to adjust the position of the pin 46, etc.

Figures 6, 7:
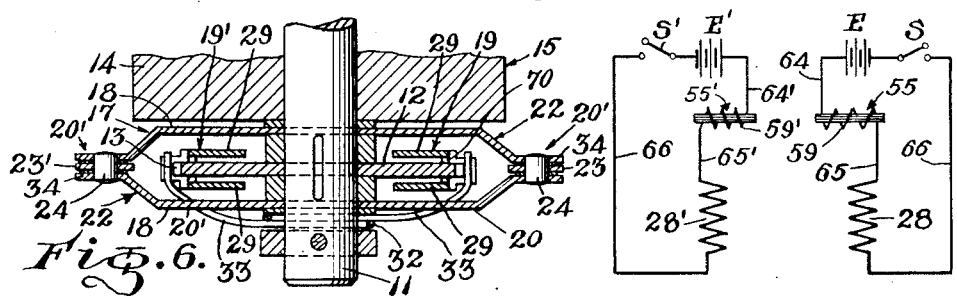
Fig. 6 is a detailed sectional view taken on the line 6—6 of Fig. 1.
Fig. 7 is a diagram of the motor's electric circuit.

Fig. 7 illustrates, in skeleton form, a diagram of the operating circuit of the motor. From a pair of any suitable current sources E and E', controlled by any selected means such as switches S and S' respectively, pulses are transmitted to the coils 59 of the releasing magnets 55, 55' respectively, through conductors 64, 64' respectively, and thence through conductors 65, 65' respectively to the energizing solenoids 28, 28' respectively, which may be connected to switches S, S' as indicated. The respective circuits embody a series arrangement in which each coil 59 or 59' is connected in series to its companion coil 28 or 28' and to its respective input circuit to form an individual pulse actuated circuit, the two circuits being in parallel to ground. Each of the circuits may be triggered by a known electronic circuit including a radiofrequency component having an aerial to receive a radio signal, and an amplifying component for amplifying the signal into a pulse of sufficient electrical magnitude to actuate a relay (e. g. switch S or S') which in turn controls the pulses which actuate the electromagnet and solenoid element of the respective circuit. The respective receiver circuits are of course tuned to different frequencies so that each will respond only to its own signal. Thus, a transmitter having means for transmitting two signals of two different frequencies, and having corresponding control devices for each frequency, may be employed. For example, manual switches in the form of telegraph keys, could be selectively actuated to transmit a single pulse each time a key were depressed. The pulse, transmitted by aerial waves, would be received by a corresponding receiver circuit, amplified, and utilized to effect transmission of a single pulse to the releasing magnet and energizing solenoid of the respective operating circuit of the motor. One signal would be utilized to operate the motor in a forward direction, the other signal would be utilized to operate the motor in reverse direction. Assuming that the forward direction, as viewed in Fig. 1, is clockwise, solenoid 28 would be the actuator for forward drive and solenoid 28' for reverse drive. The forward driving pulse will actuate holding pawl releasing solenoid 55 to lift the corresponding holding pawl 47 and will actuate the forward driving solenoid 28, moving the armature 27 so as to deliver a clockwise pull to pawl carrier 17 through the corresponding connecting rod 23 thereof, until the pawl carrier engages stop pin 37. The movement of the pawl carrier 17 is transmitted through driving pawl 19' to the ratchet wheel 12, while the pawl 19, restrained by engagement with release pin 46, moves out of engagement with the teeth 13. As the ratchet wheel is thus rotated, holding pawl 47' will ratchet over one tooth 13, yielding upwardly against the resistance of spring 49—52, and will drop into a notch one tooth removed from its previous position, as the carrier 17 reaches its limit position. At this position, further movement is restrained by engagement of arm 29 against stop pin 37. The energy of the pulse having been expended, the pawl carrier 17 will promptly be returned to the neutral position by the action of leaf spring 39' yieldingly pressing against the left side of roller 38. As it does so, ratchet wheel 12 will be held in a stationary position by holding pawl 47', and driving pawl 19 will be guided by releasing pin 46 in longitudinal movement, into engagement with a tooth 13 one tooth removed from the tooth previously engaged thereby, while pawl 19' ratchets over one of the teeth 13 to assume a new position one tooth removed from its previous position. A subsequent pulse will repeat this sequence of operations, advancing the ratchet wheel 12 another tooth space in a counterclockwise direction.

Figure 5:
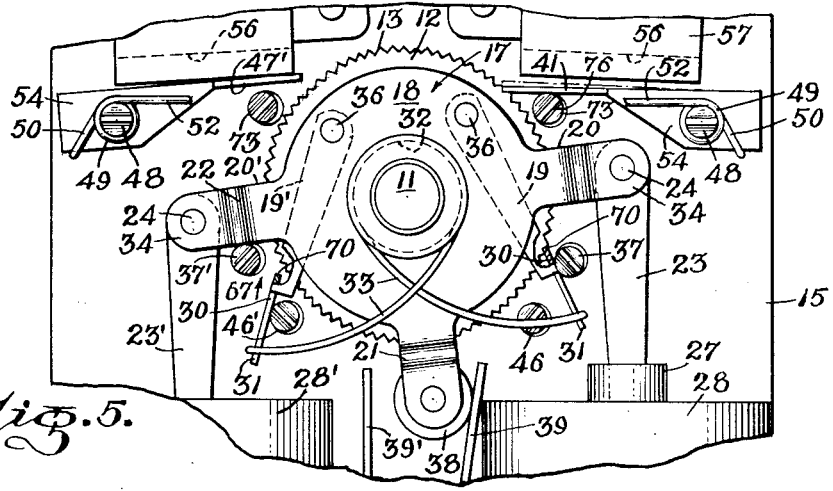
Fig. 5 is a detailed fragmentary front view of the same showing a limit of one step of movement of the apparatus in operation.

Upon reception of a pulse of the reversing signal, electromagnet 55' will be energized to lift holding pawl 47' and reversing solenoid 28' will be energized to rotate pawl carrier 17 counterclockwise, transmitting such rotation to ratchet wheel 12 through pawl 19 which remains in engagement therewith, while pawl 19' is restrained by releasing pin 46', allowing the ratchet wheel to disengage therefrom, and holding pawl 47 ratchets over wheel 12. This operation is indicated in Fig. 5, the limit of rotation, determined by engagement of carrier arm 20' with stop pin 37', being shown in that view. When the energy of the pulse has been expended, the pawl carrier will be returned to its neutral position by the action of leaf spring 39 yieldingly pressing against the right side of roller 38, ratchet wheel 12 being held stationary by holding pawl 47 and driving pawl 19' being guided by releasing pin 46' in longitudinal movement indicated by arrow 67, into engagement with a tooth 13 one tooth removed from the tooth previously engaged thereby, while pawl 19 ratchets over one of the teeth 13 to assume a new position one tooth removed from its previous position.

It will now be apparent that by properly positioning the stop pins 37, 37', with reference to the pawls 19, 19', the extent of movement of the ratchet wheel may be accurately determined as the distance between consecutive teeth, or between alternate teeth, etc. In practice, it is preferable to locate the stop pins 37, 37' so that the driving pawl will very slightly overtravel the position to which it must move the ratchet wheel in order to establish the movement of the selected number of teeth, in order that the ratcheting of the corresponding holding pawl over a corresponding number of teeth, the clearing of the last tooth by the end of the pawl, and the dropping of the end thereof into the notch thereof beyond said last tooth, may be assured. A slight retrograde movement, to bring said last tooth into full engagement with the end of the holding pawl, may then occur. However, the rest position of the ratchet wheel will be advanced beyond the previous position a distance corresponding exactly to the width of one tooth.

An important characteristic of the invention is the engaged relation between the driving pawls and the ratchet wheel in the neutral position of the pawl carrier. In this connection it may be noted that as the pawl carrier is moved on the return stroke to the neutral position, the inactive pawl will be drawn into substantial engagement with one of the teeth 13 and the active pawl will ratchet over one or more teeth and drop into a notch with its driving end in substantial engagement with a new tooth. There is no appreciable slack or lost motion between the pawls and the ratchet wheel teeth. Both driving pawls are in position to immediately commence driving when a pulse is received. Consequently, no energy is wasted in advancing a pawl into driving engagement with a tooth, and there is no possibility of inaccurate operation in which the pawl may sometimes advance the wheel by more or less than the selected number of teeth.

Figure 8:
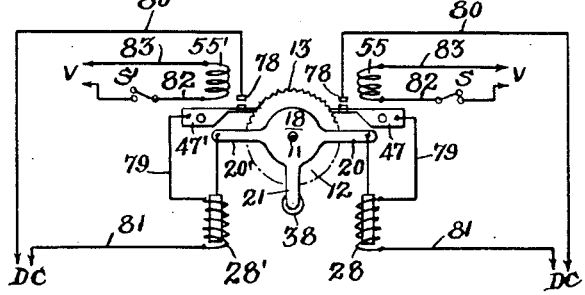
Fig. 8 is a diagram of a modified form of the pulse motor and circuit arrangement.

Fig. 8 illustrates a modified form of the invention in which solenoids 55, 55' and 28, 28' are energized from separate current sources, the energization of solenoids 28, 28' being controlled by the movement of holding pawls 47, 47' to releasing positions. Each of the pawls 47 and 47' carries a contact for engagement with a fixed contact 78 (which may be substituted for stop pin 73) and solenoids 28, 28' receive their electrical energy through circuits including a conductor 79, pawl 47 or 47', a conductor 80, a direct current source DC, and a conductor 81. Solenoids 55, 55' are energized through circuits each including a source of control voltage V, a switch S (or S') and conductors 82, 83. Holding pawl 47 (or 47') must release from ratchet wheel 12 before a circuit to the corresponding driving solenoid 28 (or 28') can be established.

I claim:

1. In a reversible pulse motor, a ratchet wheel having peripheral teeth, a pawl carrier mounted for oscillating movement about the axis of said ratchet wheel, a pair of pawls each having one end pivotally connected to said carrier and having at its other end a jaw to engage the ratchet teeth, means yieldingly biasing said pawls normally into driving engagement with said teeth, a pair of pulse actuated driving means for oscillating said carrier in opposite directions, stop means for the respective pawls, each positioned to be engaged by a non-driving pawl to deflect the same outwardly to clear the teeth of said ratchet wheel while the other pawl is driving the ratchet wheel in response to actuation of said carrier by a pulse, a pair of holding pawls, each normally engaging said ratchet wheel to resist rotation thereof in a respective direction, and pulse operated means for releasing from its engagement with the ratchet wheel that holding pawl which would, if engaged, prevent rotation of the ratchet wheel by the driving pawl, whereby to release the ratchet wheel for rotation.

2. A motor as defined in claim 1, wherein each of said holding pawl releasing means is electrically connected in series to the pulse actuated driving means for the actuated driving pawl, whereby a single pulse may actuate both the releasing means and the driving means.

3. A pulse motor as defined in claim 2, wherein said holding pawls have lower moments of inertia than said driving means, whereby said holding pawls will be actuated in advance of the driving means.

4. In a reversible pulse motor: a ratchet wheel; an output shaft on which said wheel is secured; means in which said shaft is journalled for rotation; a pawl carrier comprising spaced members embracing said ratchet wheel between them and journalled on said shaft; a pair of pawls each having a pair of spaced arms received between said ratchet wheel and respective carrier members and pivoted to the latter, and a web portion integrally connecting said spaced arms and having a jaw to engage the periphery of said ratchet wheel; means yieldingly biasing said pawls into driving engagement with said teeth, a pair of pulse actuated driving means for oscillating said carrier in opposite directions, a stop means for the respective pawls, each positioned to be engaged by a non-driving pawl to release the same from driving engagement with the ratchet wheel while the other pawl is driving the ratchet wheel in response to actuation of said carrier by a pulse.

5. A pulse motor as defined in claim 4, wherein said yielding biasing means comprises a spring embodying a coiled central portion encircling said shaft and a pair of end arms projecting tangentially from the respective ends of said coiled portion, attached to the respective pawls, and stressed to draw them toward one another.

6. In a reversible pulse motor, a ratchet wheel having peripheral teeth, a pawl carrier mounted for oscillating movement about the axis of said ratchet wheel, a pair of pawls each having one end pivotally connected to said carrier and having at its other end a jaw to engage the ratchet teeth, means yieldingly biasing said pawls into driving engagement with said teeth, a pair of pulse actuated driving means for oscillating said carrier in opposite directions, means yieldingly biasing said carrier to a neutral position from which it is adapted to be oscillated in opposite directions by the respective driving means, and stop means for the respective pawls, each positioned to be engaged by a non-driving pawl to disengage the same from the ratchet wheel while the other pawl is driving the ratchet wheel in response to actuation of said carrier by a pulse.

7. In a reversible pulse motor, a ratchet wheel having peripheral teeth, a pawl carrier mounted for oscillating movement about the axis of said ratchet wheel, a pair of pawls each having one end pivotally connected to said carrier and having at its other end a jaw to engage the ratchet teeth, means yieldingly biasing said pawls into driving engagement with said teeth, a pair of pulse actuated driving means for oscillating said carrier in opposite directions, a pair of stop means engageable by respective driving pawls at limit positions of respective driving movements of said carrier, means yieldingly biasing said carrier for return movement from either of said limit positions to a neutral starting position, and stop means for the respective pawls, each positioned to be engaged by a non-driving pawl to disengage the same from the ratchet wheel while the other pawl is driving the ratchet wheel in response to actuation of said carrier by a pulse.

8. A motor as defined in claim 7, wherein said carrier biasing means comprises a roller mounted on said carrier, a pair of resilient means yieldingly acting against opposite sides of said roller, and stop means engageable by the respective yielding means to limit their movement toward one another, thus to determine said neutral position.

9. A motor as defined in claim 7, wherein said carrier biasing means comprises a pair of leaf springs disposed in spaced relation with free ends normally in engagement with opposite sides of said roller to determine said neutral position of the carrier, and a bracket to the opposite sides of which the other ends of said leaf springs are secured, said bracket having opposed stops normally abutted by intermediate portions of the respective leaf springs to determine the positions of said free ends for said normal engagement with the roller.

10. In a reversible pulse motor: a ratchet wheel; an output shaft on which said wheel is secured; means in which said shaft is journalled for rotation; a pawl carrier comprising spaced members embracing said ratchet wheel between them and journalled on said shaft; a pair of pawls each having a pair of spaced arms received between said ratchet wheel and respective carrier members and pivoted to the latter, and a web portion integrally connecting said spaced arms and having a jaw to engage the periphery of said ratchet wheel; means yieldingly biasing said pawls into driving engagement with said teeth, a pair of pulse actuated driving means for oscillating said carrier in opposite directions, a pair of stop means engageable by respective driving pawls at limit positions of respective driving movements of said carrier, means yieldingly biasing said carrier for return movement from either of said limit positions to a neutral starting position, and stop means for the respective pawls, each positioned to be engaged by a non-driving pawl to disengage the same from the ratchet wheel while the other pawl is driving the ratchet wheel in response to actuation of said carrier by a pulse.

11. In a combination, a ratchet wheel, an output shaft on which said wheel is secured; means in which said shaft is journalled for rotation; a pawl carrier comprising spaced members embracing said ratchet wheel between them and journalled on said shaft; a pair of pawls each having a pair of spaced arms received between said ratchet wheel and respective carrier members and pivoted to the latter, and a web portion integrally connecting said spaced arms and having a jaw to engage the periphery of said ratchet wheel; means yieldingly biasing said pawls into driving engagement with said teeth, a pair of stop means engageable by respective driving pawls at limit positions of respective driving movements of said carrier, means yieldeingly biasing said carrier for return movement from either of said limit positions to a neutral starting position, and stop means for the respective pawls, each positioned to be engaged by a non-driving pawl to disengage the same from the ratchet wheel while the other pawl is driving the ratchet wheel in response to actuation of said carrier by a pulse.

LEE B. JOHNSON.

References Cited in the file of this patent

UNITED STATES PATENTS

| Number | Name | Date |
|---|---|---|
| 793,389 | McBerty et al. | June 27, 1905 |
| 901,189 | Regan | Oct. 13, 1908 |
| 1,142,858 | Tatum | June 15, 1915 |